US 11,866,153 B2

(12) United States Patent
Le Roux et al.

(10) Patent No.: US 11,866,153 B2
(45) Date of Patent: Jan. 9, 2024

(54) FORCE APPLICATION DEVICE FOR A CONTROL STICK OF AN AIRCRAFT

(71) Applicant: SAFRAN ELECTRONICS & DEFENSE, Paris (FR)

(72) Inventors: Corentin Le Roux, Moissy-Cramayel (FR); Mickael Werquin, Moissy-Cramayel (FR); Yannick Attrazic, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 426 days.

(21) Appl. No.: 17/418,476

(22) PCT Filed: Dec. 26, 2019

(86) PCT No.: PCT/FR2019/053300
§ 371 (c)(1),
(2) Date: Jun. 25, 2021

(87) PCT Pub. No.: WO2020/136357
PCT Pub. Date: Jul. 2, 2020

(65) Prior Publication Data
US 2022/0097826 A1    Mar. 31, 2022

(30) Foreign Application Priority Data

Dec. 28, 2018 (FR) ........................ 1874315
Mar. 22, 2019 (FR) ........................ 1903013

(51) Int. Cl.
*G05G 9/047* (2006.01)
*B64C 13/04* (2006.01)
*G05G 5/05* (2006.01)

(52) U.S. Cl.
CPC ......... *B64C 13/0421* (2018.01); *G05G 9/047* (2013.01); *G05G 5/05* (2013.01);
(Continued)

(58) Field of Classification Search
CPC ... B64C 13/0421; B64C 13/042; B64C 13/14; B64C 27/56; G05G 9/047;
(Continued)

(56) References Cited

U.S. PATENT DOCUMENTS 5,129,277 A * 7/1992 Lautzenhiser ..... G05G 9/04785
74/471 XY
5,675,359 A * 10/1997 Anderson ............ G05G 9/047
345/161
(Continued)

FOREIGN PATENT DOCUMENTS

EP    1980927 A2 * 10/2008 ............... G05G 9/04
FR    2 647 922 A1    12/1990
(Continued)

OTHER PUBLICATIONS

International Search Report dated Apr. 3, 2020 in International Application No. PCT/FR2019/053300.
(Continued)

*Primary Examiner* — Daniel D Yabut
*Assistant Examiner* — Brian J McGovern
(74) *Attorney, Agent, or Firm* — Sughrue Mion, PLLC

(57) ABSTRACT

The invention relates to a force application device for a control stick of an aircraft, said control stick comprising a control lever that is connected to at least one motor comprising a drive shaft that can be rotated about an axis, the force application device comprising: a first pin connected to the shaft, a housing, an electromagnet, a movable actuator comprising a magnetic material, a coupling device comprising an input gear connected to the housing and an output gear comprising a second pin, and means for clamping the first pin and the second pin which comprise a first tooth and a second tooth, said device having an operating configuration in which the electromagnet is active and the output gear
(Continued)

is positioned at a distance from the input gear, and a blocking configuration in which the electromagnet is inactive and the gears are meshed.

11 Claims, 4 Drawing Sheets

(52) U.S. Cl.
 CPC ............. *G05G 2009/04718* (2013.01); *G05G 2009/04766* (2013.01); *G05G 2505/00* (2013.01)

(58) Field of Classification Search
 CPC .......... G05G 2009/04766; G05G 2009/04718; G05G 2009/04714; G05G 2009/04703; G05G 5/03; G05G 5/05; G05G 2505/00; G05G 1/04; H01H 25/04
 See application file for complete search history.

(56) References Cited

U.S. PATENT DOCUMENTS

| | | | |
|---|---|---|---|
| 11,390,372 B2* | 7/2022 | Werquin | G05G 5/03 |
| 2002/0063015 A1* | 5/2002 | Sugitani | G05G 9/047 |
| | | | 180/444 |
| 2004/0204811 A1* | 10/2004 | Huang | G05G 5/03 |
| | | | 701/50 |
| 2004/0259687 A1 | 12/2004 | Ritter et al. | |
| 2011/0155861 A1* | 6/2011 | Antraygue | B64C 13/0421 |
| | | | 244/236 |
| 2013/0256463 A1* | 10/2013 | Antraygue | B64C 13/0421 |
| | | | 244/234 |
| 2016/0061146 A1* | 3/2016 | Werquin | F16H 25/2454 |
| | | | 92/15 |
| 2016/0170435 A1* | 6/2016 | Brinkley | G05G 1/04 |
| | | | 74/510 |
| 2016/0252926 A1* | 9/2016 | Gomolko | B64C 13/0421 |
| | | | 244/234 |
| 2017/0308113 A1* | 10/2017 | Izzo | B64C 13/12 |
| 2018/0197385 A1 | 7/2018 | Jayaraman et al. | |
| 2020/0011707 A1* | 1/2020 | Antraygue | G01D 5/2046 |
| 2022/0057826 A1* | 2/2022 | Lawniczak | G05G 5/03 |
| 2022/0063794 A1* | 3/2022 | Le Roux | B64C 13/0421 |
| 2022/0073187 A1* | 3/2022 | Werquin | B64C 27/56 |
| 2022/0212780 A1* | 7/2022 | Lawniczak | G06F 3/016 |
| 2022/0348310 A1* | 11/2022 | Lawniczak | G05G 5/03 |

FOREIGN PATENT DOCUMENTS

| | | |
|---|---|---|
| FR | 3 011 815 A1 | 4/2015 |
| FR | 3 025 493 A1 | 3/2016 |

OTHER PUBLICATIONS

Written Opinion of the International Searching Authority dated Apr. 3, 2020 in International Application No. PCT/FR2019/053300.
French Search Report and Written Opinion dated Oct. 7, 2019 by the French Patent Office in French Application No. 1903013.

* cited by examiner

[Fig. 1]
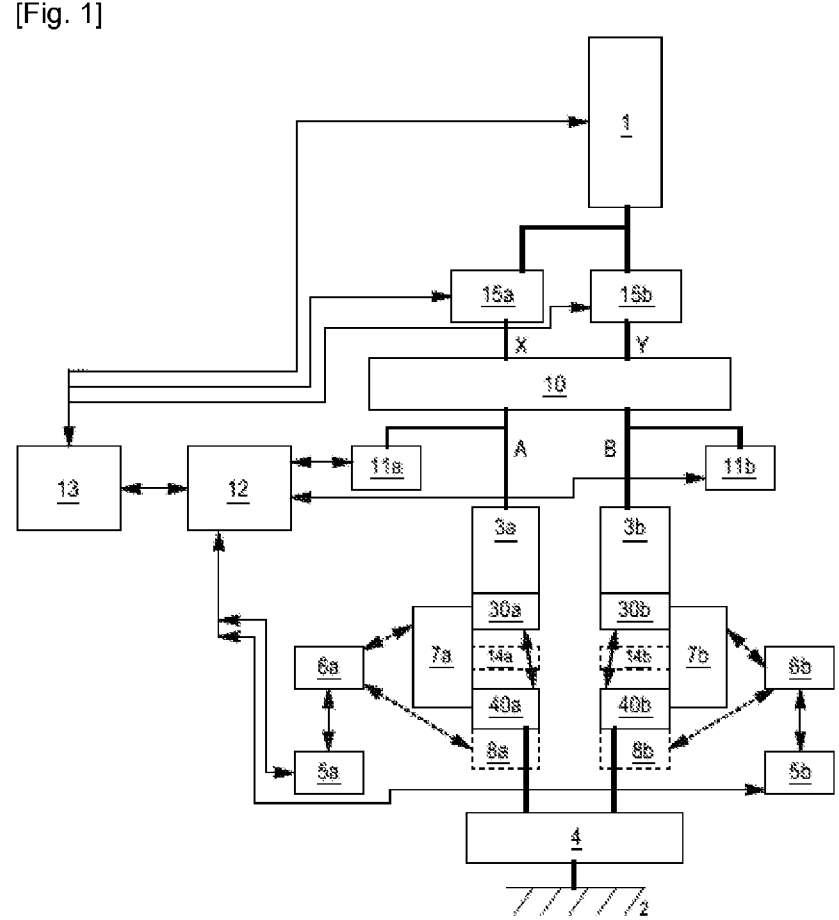

[Fig. 2]
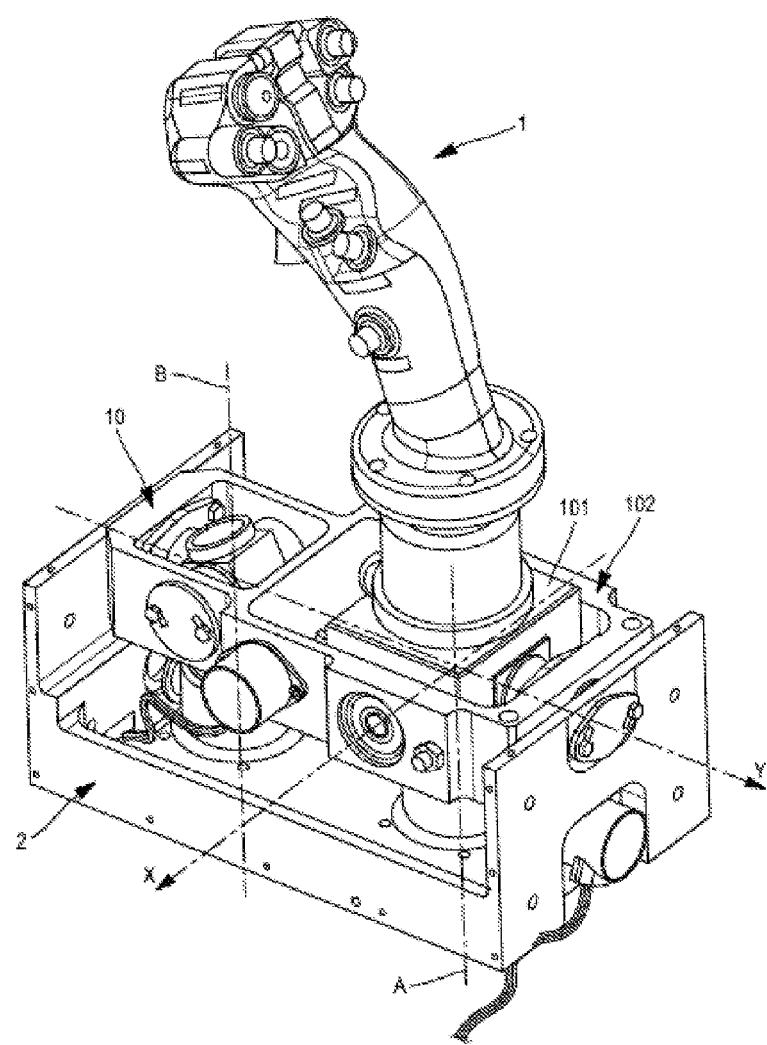

[Fig. 3]
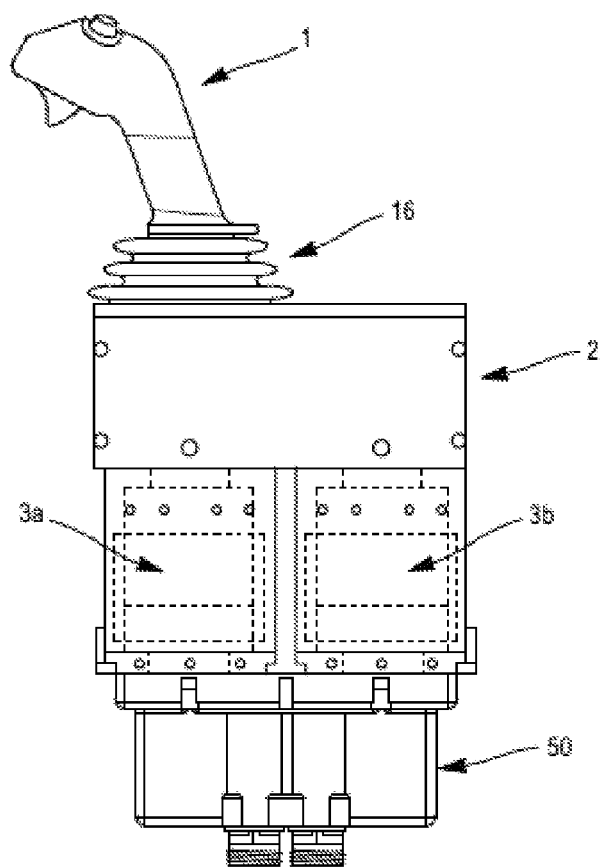

[Fig. 4]
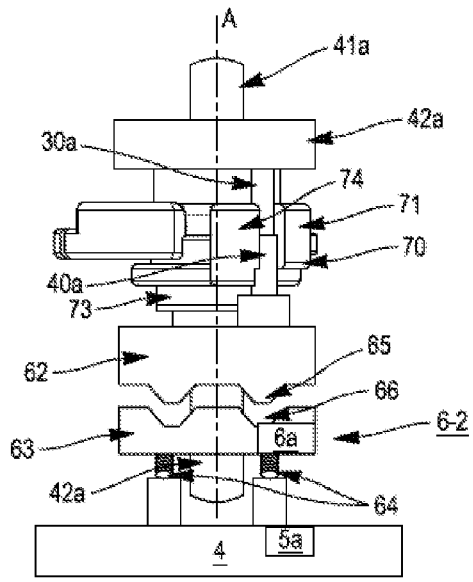
[Fig. 5]
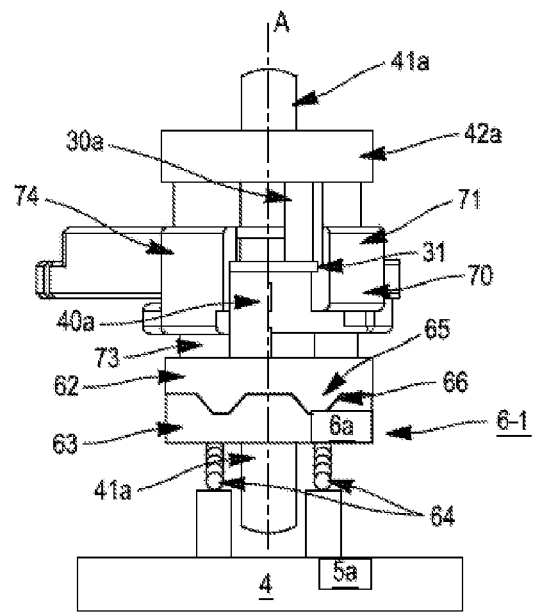

FORCE APPLICATION DEVICE FOR A CONTROL STICK OF AN AIRCRAFT

CROSS-REFERENCE TO RELATED APPLICATIONS

This application is a National Stage of International Application No. PCT/FR2019/053300 filed Dec. 26, 2019, which claims priority under U.S.C. § 119(a) to French Patent Application no. 1874315 filed on Dec. 28, 2018 and French Patent Application no. 1903013 filed on Mar. 22, 2019, the entire contents of each of which being herein incorporated by reference in their entireties.

FIELD OF THE INVENTION

The invention relates to control devices used by the pilot in an aircraft cockpit. It particularly relates to an active stick comprising integrated force feedback to assist the pilot.

TECHNICAL BACKGROUND

A control device in an aircraft cockpit usually comprises a control stick with in particular a control lever mounted rotatably along a so-called roll axis and a so-called pitch axis, these two axes being both orthogonal to one another. Devices of the "joystick" type are most commonly encountered.

As a function of the position of the lever along these two axes, the control device transmits displacement commands to control members of the aircraft.

In more recent aircraft models, control of the aircraft movements is electronic and the control device integrated into the cockpit can be of "sidestick" type. The position of the lever along the two roll and pitch axes is measured by sensors and converted into movement controls. The lever is not directly linked mechanically to the movable parts of the aircraft. There is no direct mechanical feedback on the lever for the pilot.

However, it is desirable for the flight safety that the pilot experiences mechanical feedback on the lever. The indicator systems of the cockpit cannot be sufficient to cause a quick enough reaction of the pilot faced with unexpected events during the flight. The sensations of control are often much better if the control sidestick includes force feedback, also known as "haptic feedback".

In this regard, sidesticks equipped with passive mechanical systems, such as spring systems, or active electromechanical systems have been provided.

Moreover, provision has been made in the document FR 3 011 815 for an active force feedback with an electric motor. Typically, in this document, the aircraft flight control device includes a control lever mounted on a plate and connected to a roll axis motor and a pitch axis motor by way of transmission shafts. The two motors are controlled according to a force law, such as to generate a resistive force opposing the force exerted on the lever (force feedback) when a force threshold is exceeded by the pilot.

Such a device proves effective in restoring the sensations of control and in increasing flight safety. However, in the event of an electrical or mechanical fault in one of the motors or in the event of a malfunction on the control signal processing of the motors, the force feedback can be removed.

In the field of aeronautics, the requirements are high regarding availability of piloting devices. It is therefore not acceptable that the pilot goes abruptly into a feedback-less piloting mode, in the event of a malfunction of an engine or its processing chain.

Furthermore, the active force feedback systems of the prior art often so comprise a large number of components, particularly the roll and pitch motors but also clutches, torque limiters, gears etc. These systems can prove expensive, bulky and difficult to integrate into an aircraft cockpit.

SUMMARY OF THE INVENTION

In view of the above, a need exists for a control stick incorporating a mechanical back-up channel, to prevent the rotation of the lever being free and the pilot losing all force feedback, in the event of an electrical faulting affecting a force feedback motor.

The desired stick must not be able to toggle, in the event of a malfunction affecting said motor, into a mode in which the pilot freely pivots the lever.

A secondary need exists for a control stick wherein, in the event of a malfunction affecting said motor, the lever is not completely immobilized and the pivoting movements of the lever are damped.

Preferably, the desired mechanical back-up channel supplies a variable resistive force as a function of the position of the lever with respect to a neutral point, in the event of a malfunction affecting the force feedback motor.

A sidestick of lower weight, bulk and power consumption than the existing sidesticks is also desired.

In this regard, according to a first aspect, the invention relates to a force application device for a control stick of an aircraft, wherein the control stick comprises a control lever connected to at least one motor comprising a drive shaft rotationally movable about an axis, the force application device comprising:

a first pin, connected to the shaft,
a casing, configured to be fixed with respect to the aircraft,
an electromagnet,
an actuator that is movable with respect to the casing, said actuator comprising a magnetic material,
a coupling device comprising an input mesh, connected to the casing, and an output mesh configured to cooperate with the input mesh,
said output mesh comprising a second pin,
a first tooth and a second tooth configured to clamp the first pin and the second pin,
wherein the force application device has an operational configuration where the electromagnet is active and the output mesh is positioned at a distance from the input mesh such that the second pin is rotationally mobile about the axis, and a locking configuration where the electromagnet is inactive and the output mesh is meshed with the input mesh such as to rotationally lock the second pin with respect to the casing.

A first advantage of the invention is to supply a mechanical back-up channel to prevent the lever from being completely free in its pivoting movement. In the event of a fault affecting the motor, the electromagnet is no longer active and the force application device enters a locking configuration.

A resistive torque, opposing the rotation of the first pin with respect to the casing, is exerted on the first pin when the force application device is in the locking configuration. Specifically, the clamping means comprise teeth that clamp the first pin and the second pin, the second pin rotating as a single part with respect to the casing. The drive shaft is then braked in its rotational movement.

An advantage of the invention is that the mechanical back-up channel supplied by the force application device is reversible, the force application device being able to once again enter an operational configuration when the electromagnet is active again. The relative position of the meshes is controlled via the electromagnet to alternate between the operational configuration and the locking configuration. This alternation is possible both on the ground and in flight.

A second advantage is to avoid the complete immobilization of the drive shaft associated with the motor, when an electrical malfunction affects the motor and when the electromagnet is no longer active. Specifically, the clamping means do not necessarily completely lock a rotation of the first pin with respect to the second pin.

The force application device of the invention, when in the locking configuration, tends to bring the first pin into a position that depends on the position of the second pin at the time of deactivating of the electromagnet. The second pin being rotationally movable about the axis in the operational configuration, it is possible that the position of the second pin upon this deactivation does not correspond with a central position of the lever.

The force application device according to the invention can have the following optional and non-limiting features, taken alone or in any of the technically possible combinations:
- the actuator is mounted on the input mesh.
- the electromagnet is mounted on the casing, such that the actuator is at an axial position between the electromagnet and the output mesh along the axis.
- the device comprises return means including a first end attached to the casing and a second end attached to the input mesh, the return means being configured to displace the input mesh along the axis.
- one of the input mesh and the output mesh comprises at least one tooth, the other of the input mesh and the output mesh comprising at least one additional housing, the tooth being configured to enter the complementary housing in the locking configuration.
- the clamping means include a first jaw and a second jaw, the device further comprising an elastic compressive link, such as a compression spring, connecting the first jaw and the second jaw such as to exert a force on the first tooth and the second tooth against the first pin and the second pin in the operational configuration.
- the device further comprises an angular displacement sensor configured to acquire a measurement of the angular displacement of the shaft.
- the device further comprises a damping part extending over a contact surface between the first pin and the second pin.
- the device further comprises a disengaging device configured to disengage the input mesh and the output mesh, said device comprising a second supply circuit separate from a standard supply circuit of the electromagnet, in order to allow the disengagement of said meshes when the standard supply circuit of the electromagnet is faulty.
- said output mesh is connected to the actuator.

According to a second aspect, the invention relates to a control stick of an aircraft comprising a control lever, comprising at least one motor having a drive shaft rotationally movable about an axis, and further comprising one force application device as defined previously per motor.

BRIEF DESCRIPTION OF THE DRAWINGS

Other features, aims and advantages of this invention will become more apparent on reading the following detailed description, accompanied by the appended drawings given by way of non-limiting example, wherein:

FIG. 1 functionally represents the overall architecture of a control system comprising a control stick according to an embodiment;

FIG. 2 is a perspective view of the aircraft control lever and the mechanical coupling of the system of FIG. 1;

FIG. 3 is a side view of the lever of FIG. 1 incorporating a force feedback device;

FIG. 4 is a schematic side view of an interface between a motor shaft and a casing comprising a force feedback device according to an embodiment of the invention, viewed in an operational configuration excluding any electrical malfunction;

FIG. 5 is a schematic side view of the motor/casing interface comprising the force feedback device of FIG. 4, viewed in a locking configuration in the event of an electrical malfunction.

DETAILED DESCRIPTION OF EMBODIMENTS

The examples below relate to a force application device intended to operate with a control stick that is rotary along roll and pitch axes. The invention is however applicable with the same advantages to a lever that is rotary along a single axis, or else along any number of axes.

In the description hereinafter and in the appended figures, similar elements are associated with the same alphanumeric references.

Overall Architecture of the Control System

FIGS. 1 to 3 represent a control system of an aircraft, comprising a control stick according to an exemplary embodiment.

The stick is typically located in the aircraft cockpit. The stick is usable by the aircraft pilot to control movable parts of the aircraft electronically.

In FIG. 1, the bold solid lines between two functional units correspond to mechanical connections, the bold connecting arrow lines represent a mechanical or magnetic coupling of two units (with possible uncoupling) and the fine connecting arrow lines are electronic connections allowing data transmission.

The control stick comprises a control lever 1, mounted rotatably with respect to a jig 2. The force application device comprises a mechanical coupling 10. The lever 1 is rotary along a roll axis X and a pitch axis Y, the two axes being orthogonal. The mechanical coupling 10 is attached to a jig 2 forming a single part with the floor of the aircraft cockpit.

In this example, the control stick comprises an electric motor 3a comprising a drive shaft of axis A linked to the roll axis X of the lever. The term "linked to the axis" should be understood to mean that a linking mechanism exists between the shaft of axis A and an element of the jig 2 set in motion when the lever pivots along the X axis. Similarly, the stick comprises an electric motor 3b comprising a drive shaft of axis B linked to the pitch axis Y of the lever.

As an alternative, the motor 3a could be arranged to work directly on the axis X via a turning shaft linked to the coupling 10 and the motor 3b could be arranged to work directly on the axis Y via a turning shaft linked to the coupling 10.

The motors 3a and 3b are configured to apply a force on their respective drive shaft. Preferably, the force applied by the motors is computed according to a force law, as a function of the position of the lever.

To acquire the lever position information, the stick preferably comprises sensors of the angular displacement of the lever. Said sensors preferably comprise a sensor 11a associated with the roll axis and a sensor 11b associated with the pitch axis. Said sensors communicate electronic position signals to a computer 12.

According to an example, the sensors 11a and 11b acquire a rotary position of the drive shafts, along the axes A and B respectively.

The computer 12 comprises an electronic interface with the sensors. It can thus receive acquired data about the angular displacement of the lever. Optionally, the sensors 11a and 11b are also configured to communicate to the computer 12 information about the rotation speed of the lever 1 along their associated axes.

The information about the position/speed of the lever are translated into control signals for controlling the movable parts of the aircraft by an FCS or Flight Control System 13 of the aircraft.

As an option, the control stick comprises force sensors 15a and 15b associated with the roll axis X and the pitch axis Y of the lever respectively. Said sensors are configured to measure the torque exerted on the lever pivoting about the axis X and the axis Y. The force sensors 15a and 15b are typically strain gauges, for example of capacitive or piezoelectric type.

Such force sensors are particularly useful if the system comprises a force control mode, in addition to a displacement control mode, operational examples of which will be described in relation to the embodiments hereinafter. In a force control mode, the lever 1 is immobilized and the control unit 8 determines control signals of the movable parts of the aircraft as a function of the forces applied to the lever 1 by the pilot.

The view of FIG. 1 illustrates, in addition to the elements described above, a plurality of force application devices which will be described hereinafter.

In a form of embodiment, illustrated in the appended figures, each of the force application motors 3a and 3b comprises its own force application device, constituting a mechanical back-up line for this motor.

To simplify, only one first force application device will be described and illustrated in FIGS. 4 to 8, the second device being identical.

In FIG. 1, the alphanumeric references ending in the letter 'a' correspond to the roll axis X. The references ending in the letter 'b' are the same, transposed to the pitch axis Y.

FIG. 2 represents a structural example of embodiment of the lever 1 mounted on the mechanical coupling 10. The coupling 10 is mounted on the jig 2 which forms a single part with an airframe of the aircraft. The force application motors 3a and 3b (not visible) are here remote with respect to the lever.

The lever 1 is free at one end and attached to a first plate 101 at the other end. The first plate 101 is rotationally movable along the axis X and the axis Y and is linked to a second plate 102 of the jig 2. The axis X is linked to the first plate 101, such that a pivot of the first plate 101 about the axis Y makes the axis X pivot about the axis Y.

Two transmissions, each comprising a Cardan joint, express a rotational movement of the lever along the X axis, respectively along the Y axis, into a rotational movement of the associated drive shaft (not shown) extending along the axis A and B respectively.

The drive shafts of the motors are thus mechanically linked to the lever. The motors 3a and 3b are in direct engagement on the mechanical coupling 10 can transmit a resistive or motive force in response to the pivot movements of the lever 1 by the pilot, according to a force law or a predetermined damping law.

FIG. 3 represents the control stick and the force application device in side view. The lever 1 is here in the neutral position. The neutral position usually corresponds to a position in which the control commands work neither in roll nor in pitch on the movable parts of the aircraft. The lever 1 is mounted on the cabin of the cockpit at the level of a base having a bellows 17. The motors 3a and 3b are therefore hidden by the walls of the aircraft compartment.

The roll motor 3a and the pitch motor 3b are, in this example, of identical dimensions. The elements providing the mechanical back-up channel of the motors are here located under the motors, inside the unit 50. The drive shafts associated with the motors extend inside the unit 50. The latter is fixed with respect to the casing 4.

For more details on the structure of the mechanical coupling 10 and the mechanical link with the motors 3a and 3b, refer to FIG. 1 of the document FR 3 011 815 and the description pertaining thereto.

Force Application Device

The control system comprises a mechanical back-up channel for at least one of the force feedback motors 3a and 3b (and preferably, for each of these motors), in order to prevent the rotation of the lever 1 being completely free in the event of an electrical fault affecting said motor. The remainder of the text will describe the mechanical back-up channel for the roll motor 3a driving the shaft 41a of axis A. Owing to the mechanical back-up, in the event of a fault the pilot retains a force feedback or "haptic feedback".

The back-up channel is realized by the force application device comprising a first pin 30a, a second pin 40a, means 7a for clamping the first pin and the second pin, an electromagnet 5a, an actuator 6a comprising a magnetic material and a casing 4. The casing is secured to a jig of the aircraft. The force application device has two separate configurations:
  an operational configuration, wherein the actuator 6a is located in a position bearing the reference 6-2 in the figures, wherein the electromagnet 5a is active and exerts a force on the actuator 6a,
  a locking configuration, wherein the electromagnet is inactive and wherein the actuator 6a is found in a retracted position bearing reference 6-1 in the figures. The first pin 30a then undergoes a resistive force opposing rotational movements of the first pin 30a with respect to the casing 4 about the axis A, a first tooth 71 and a second tooth 74 of the clamping means 7a clamping together the first pin 30a and the second pin 40a.

In particular, in the example hereinafter, the second pin 40a is borne by an output mesh facing an input mesh connected to the casing.

Thus, the fact of supplying current to the electromagnet 5a, or cutting the current, causes a displacement of the actuator 6a and a change of configuration of the force application device. In the example hereinafter, in the operational configuration, the input and output meshes are not meshed.

Conversely, when the force application device is in the locking configuration, the two meshes are meshed. The casing 4 being fixed with respect to the jig 2 and the first pin 30a being connected to the drive shaft 41a of the motor 3a, the pilot feels a resistive force when he tries to displace the lever 1 in the roll direction, while the force application device is in the locking configuration—despite the fault of the roll electric motor 3a.

According to an advantageous embodiment, the force application device comprises a disengaging device 16a allowing the disengagement of the two meshes 62 and 63, even when the standard supply circuit of the electromagnet 5a is faulty. The disengaging device 16a comprises a second supply circuit to re-supply, on command, the electromagnet 5a and reactivate the latter. The second supply circuit of the electromagnet is separate from its standard supply circuit. Advantageously, the disengaging device 16a comprises a user interface located on the lever 1, such as a switch of button type. For example, while the pilot presses the button, the electromagnet is active again and the input and output meshes are disengaged. The pilot is able to reposition the lever along the roll and pitch axes without undergoing any resistive force from the force application device, while the button is pressed. The first pin 30a and the second pin 40a are repositioned at the same time as the lever.

If the standard supply circuit of the electromagnet 5a is the same as the supply circuit of the engine 3a, such a disengaging device gives the pilot the possibility of disengaging the input and output meshes even in the event of failure of the supply to the motor 3a in order to reposition the "neutral point" of the lever 1 as needed.

The pilot can thus select the neutral point serving as reference for the force law exerted by the force application device in the locking configuration.

Specifically, when the pilot releases the button, the position of the second pin 40a depends on the position of the lever. After the pilot has released the button, the input and output meshes are meshed again and the lever is forced into a neutral point which depends on the position the pilot has selected for the lever.

An example of a structure of the force application device is given hereinafter.

First Pin and Second Pin

The first pin 30a is mounted on the drive shaft of axis A, i.e. the first pin 30a moves in rotation with the shaft about the axis A.

In this example, the first pin is a nipple. The nipple is of cylindrical shape and protrudes from a surface part 42a rotationally moving with the shaft. The first pin can turn with respect to the casing 4.

The second pin 40a is mounted on an output mesh 62 which will be described hereinafter, the output mesh 62 being movable with respect to the casing 4 in the operational configuration.

The second pin 40a is, in the neutral position represented in FIG. 4, coaxial with the first pin 30a.

The second pin 40a is also a nipple of cylindrical shape.

Advantageously, the force application device further comprises a damping part, preferably a viscous damping part 14a, extending transversally between the first pin 30a and the second pin 40a.

Electromagnet and Actuator

The electromagnet 5a is powered by a current source of the control system of the aircraft. If said system is off or faulty, the electromagnet does not produce any particular magnetic field.

In the two modes hereinafter, and preferably, the electromagnet and the roll motor 3a are supplied with power by the same electrical current source (standard supply circuit of the electromagnet). Thus, when the motor is operational, the electromagnet transforms the electric current into a magnetic field, and in the event of an electrical malfunction affecting the roll motor 3a, the electromagnet is also affected by the malfunction and does not produce any magnetic field.

The loss of action of the electromagnet is thus automatic and immediate in the event of loss of the current of the roll motor 3a.

The electromagnet 5a is associated with an actuator 6a.

The actuator 6a is "passive" in the example hereinafter. Its displacement and its mechanical action on the pins depend on the magnetic interaction with the field of the electromagnet.

The actuator 6a comprises a magnetic material. Here the term "magnetic material" should be understood to mean a metallic material reacting to the magnetic field, such that the power supply of the electromagnet displaces the actuator.

In the example hereinafter, the material of the actuator 6a is chosen of opposite polarity to that of the electromagnet 5a. Thus:

when the electromagnet is supplied with current, the actuator 6a is forced in a direction nearer to the electromagnet;

when the electromagnet is not supplied with current, particularly in the event of a malfunction, the actuator is not forced to remain close to the electromagnet, and the actuator moves away from the electromagnet.

As an alternative, if the polarity of the magnetic material of the actuator is opposed to that of the electromagnet, the actuator is forced in a direction away from the electromagnet when the electromagnet is supplied with electric current.

Means for Clamping the Pins

The clamping means comprise a first tooth 71 and a second tooth 74 rotationally movable with respect to the casing 4 and also with respect to the first pin and the second pin. In the example hereinafter, the clamping means 7a comprise a first jaw 70 and a second jaw 73 movable with respect to the casing 4, the first tooth 71 belonging to the first jaw and the second tooth 74 belonging to the second jaw. The teeth 71 and 74 have free surfaces arranged to extend facing one another when the jaws are in the clamped position. The teeth 71 and 74 tend to align the two pins along a direction parallel to the axis A when the force application device is in the locking configuration.

The first pin 30a and the second pin 40a thus have a sufficient axial extension (here along the axis A) for the teeth 71 and 74 of the clamping means to engage with the lateral faces of the two pins, to clamp the two pins together.

FIGS. 4 and 5 relate to a particular embodiment of the force application device with a mechanical back-up channel.

The clamping means 7a are clamped, both in the operational configuration and in the locking configuration, in a mechanical equilibrium position. The first pin 30a therefore tends to align with the second pin 40a. Here the pins tend to align along a direction parallel to the axis A.

The second pin is connected to an output mesh 62 which is meshed or not meshed with an input mesh 63, according to the respective axial position of the two meshes.

FIG. 4 represents an operational configuration and FIG. 5 represents a locking configuration. The latter configuration corresponds to a damage state of the roll motor 3a. In these two figures, the first pin 30a is represented in a state pivoted about the axis A, corresponding to shifted position of the lever 1 along the roll axis with respect to a central position of the lever.

The clamping means are, in this example, jaws 70 and 73 having teeth 71 and 74.

The first jaw 70 extends under the surface part 42a. The first jaw comprises a central circular plate, drilled at its center to allow an attachment to pass through which immobilizes the jaw 70 in translation along the axis A. The jaw 70 is rotationally movable about the axis A.

The second jaw 73 comprises a central circular plate. The casing and the two jaws 70 and 73 are fixed in translation with respect to one another.

A free end of the first pin 30a and a free end of the second pin 40a extend in a separation between the two jaws. In the configuration of FIG. 5, an axial separation 31 exists between the first pin 30a and the second pin 40a.

An elastic link, preferably composed of one or more springs, connects an end of the first jaw and an end of the second jaw, such that the jaws remain in the clamped position on the first pin and on the second pin.

The force application device further comprises a mechanical coupling device between the second pin 40a and the casing 4. The coupling device comprises the input mesh 63 mounted fixed in rotation about the axis A with respect to the casing 4 and the output mesh 62 mounted fixed in rotation with respect to the second pin 40a. The two meshes are movable in translation along a direction parallel to the axis A.

By way of example, the input mesh 62 and the output mesh 63 here have the shape of an annular ring centered on the axis A of the shaft. The input mesh is at an axial position located between the jaw 73 and the output mesh.

The output mesh is, in its non-engaged position at the input mesh, movable in translation along the axis A and in rotation about the axis A. Under the action of the clamping means 7a, the second pin 40a therefore follows the rotational movement of the first pin 30a about the axis A when the meshes are not engaged.

The output mesh 63 is fixed in rotation about the axis A with respect to the casing 4. In addition, in this example, return means are attached on either side to the casing 4 or to a part secured to the casing, and on the other hand to one side of the output mesh 63 facing the casing 4. Here the return means are two springs 64. The return means tend to bring the meshes into a meshed position.

In this example, the means for securing the input mesh 63 and the output mesh 62 form a dog clutch. One from among the input mesh and the output mesh may comprise at least one tooth, preferably several, and the other mesh comprises at least as many housings of complementary shape and dimensions with respect to the teeth. In the advantageous mode wherein the force application device comprises a disengaging device to allow the selection of the neutral point of the force law, the number of teeth is advantageously high, preferably greater than three teeth, and these teeth are evenly distributed over the perimeter of the mesh which bears them to allow the accurate setting of this neutral point.

FIGS. 4 and 5 represent two teeth 65 of the output mesh 62 and two complementary housings 66 of the input mesh 63. When the input and output meshes are brought closer along the axis A, the teeth engage in the complementary housings.

The actuator 6a and the electromagnet 5a are configured such that, when the electromagnet 5a exerts a force on the actuator 6a—in the operational configuration—one from among the input mesh and the output mesh is forced in a direction away from the other mesh. The magnetic action of the electromagnet on the actuator is strong enough to counter the relaxation of the springs 64.

In this example, the actuator 6a comprises a magnetic material located in the ring of the input mesh 63 and the electromagnet 5a is located in a part of the casing 4 facing the input mesh 63. The polarities of the magnetic material and the electromagnet are the same, such that the input mesh 63 is attracted by the electromagnet.

Note that as an alternative, the electromagnet 5a can be located on the output mesh. The electromagnet is then in a position facing the actuator along a direction parallel to the axis A.

When the electromagnet 5a does not exert a force on the actuator 6a—in the locking configuration of FIG. 5—the input mesh 63 is not attracted toward the casing and is not moved away from the output mesh 62.

The mechanical equilibrium position of the coupling device is a position wherein the input mesh 63 enmeshes the output mesh 62.

Thus, the output mesh 62 locks the input mesh 63, and therefore the second pin 40a, in rotation about the axis A.

Operating Sequence of the Device with a Non-Fixed Neutral Point

In a configuration in normal operation, for example when the aircraft is in flight with an operational electrical power supply, the actuator 6a is in the separated position of FIG. 4.

The roll motor 3a preferably exerts a resistive force opposing the roll movement imposed by the pilot on the lever 1. The second pin 40a follows the rotation movements of the first pin 30a (in other words, the drive shaft) about the axis A.

In the event of a malfunction, the electromagnet no longer produces any particular magnetic field. The force application device enters the locking configuration. The means for securing the input and output meshes engage with one another. The coupling device is clutched.

The second pin 40a then rotates as a single part with respect to the casing. The clamping means 7a tend to align the first pin 30a with respect to the second pin 40a. The drive shaft of the roll motor undergoes a resistive force opposing a rotational movement of the first pin. The first pin 30a tends toward a fixed point aligned with the second pin 40a.

The drive shaft being mechanically coupled to the control lever 1 by way of the mechanical coupling 10, the resistive force tends to being the lever 1 to a neutral point.

By default, the neutral point depends on the position of the second pin upon deactivation of the electromagnet, a position which itself depends on the position of the lever 1 on the roll axis when the malfunction is triggered. The neutral point then corresponds to the last non-malfunctioning position of the second pin 40a, even if this latter position does not correspond to a central position of the lever.

A force law is implemented by the mechanical back-up channel. An advantage is to allow the obtainment of a non-fixed neutral point for the lever.

In the advantageous mode described above, a disengaging device makes it possible to disengage the input meshes and output meshes in a controlled manner during a malfunction. The neutral point of the lever serving as reference for the force law can then be different from the position of the lever when the malfunction is triggered, if the pilot has selected this neutral point after the malfunction was triggered.

The invention claimed is:

1. A force application device for a control stick of an aircraft, wherein the control stick comprises a control lever connected to at least one motor comprising a drive shaft, the drive shaft being rotationally movable about an axis, the force application device comprising:
   a first pin connected to the drive shaft,
   a casing configured to be fixed with respect to the aircraft,
   an electromagnet,
   an actuator that is movable with respect to the casing, said actuator comprising a magnetic material, a coupling device comprising an input mesh, connected to the casing, and an output mesh configured to cooperate with the input mesh, said output mesh comprising a second pin, a first tooth and a second tooth configured to clamp the first pin and the second pin, wherein the force application device has an operational configuration where the electromagnet is active and the output mesh is distant from the input mesh such that the second pin is rotationally mobile about the axis, and a locking configuration where the electromagnet is inactive and the output mesh is meshed with the input mesh such as to rotationally lock the second pin with respect to the casing.

2. The force application device of claim 1, wherein the actuator being is mounted on the input mesh.

3. The force application device of claim 2, wherein the electromagnet is mounted on the casing, such that the actuator is at an axial position between the electromagnet and the output mesh along the axis.

4. The force application device of claim 1, further comprising a biasing element including a first end attached to the casing and a second end attached to the input mesh, the biasing element being configured to displace the input mesh along the axis.

5. The force application device of claim 1, wherein one of the input mesh and the output mesh comprises at least one tooth, the other of the input mesh and the output mesh comprising at least one additional housing, the tooth being configured to enter the complementary housing in the locking configuration.

6. The force application device of claim 1, the force application device comprising a first jaw and a second jaw, the force application device further comprising an elastic compressive link, connecting the first jaw and the second jaw so as to exert a force on the first tooth and the second tooth against the first pin and the second pin in the operational configuration.

7. The force application device of claim 6, wherein the elastic compressive link comprises a compression spring.

8. The force application device of claim 1, further comprising an angular displacement sensor configured to acquire a measurement of the angular displacement of the drive shaft.

9. The force application device of claim 1, further comprising a damping part extending over a contact surface between the first pin and the second pin.

10. The force application device of claim 1, further comprising a disengaging device configured to disengage the input mesh and the output mesh, said disengaging device comprising a second supply circuit separate from a first supply circuit of the electromagnet, in order to allow the disengagement of said input and output meshes when the first supply circuit of the electromagnet is faulty.

11. A control stick of an aircraft comprising a control lever, comprising at least one motor having a drive shaft, the drive shaft being rotationally movable about an axis, the stick further comprising one force application device according to claim 1.

* * * * *